F. F. FOWLER.

Corn Harvester.

No. 57,113.

Patented Aug. 14, 1866.

UNITED STATES PATENT OFFICE.

F. F. FOWLER, OF UPPER SANDUSKY, OHIO.

IMPROVEMENT IN CORN-HARVESTERS.

Specification forming part of Letters Patent No. 57,113, dated August 14, 1866.

*To all whom it may concern:*

Be it known that I, FINDLEY F. FOWLER, of Upper Sandusky, in the county of Wyandot and State of Ohio, have invented a new and useful Improvement in Machines for Cutting, Gathering, and Shocking Corn; and I do hereby declare the following to be a full, clear, and exact description of the construction and operation of the same, reference being had to the accompanying drawings, making a part of this specification, in which—

Figure 1:
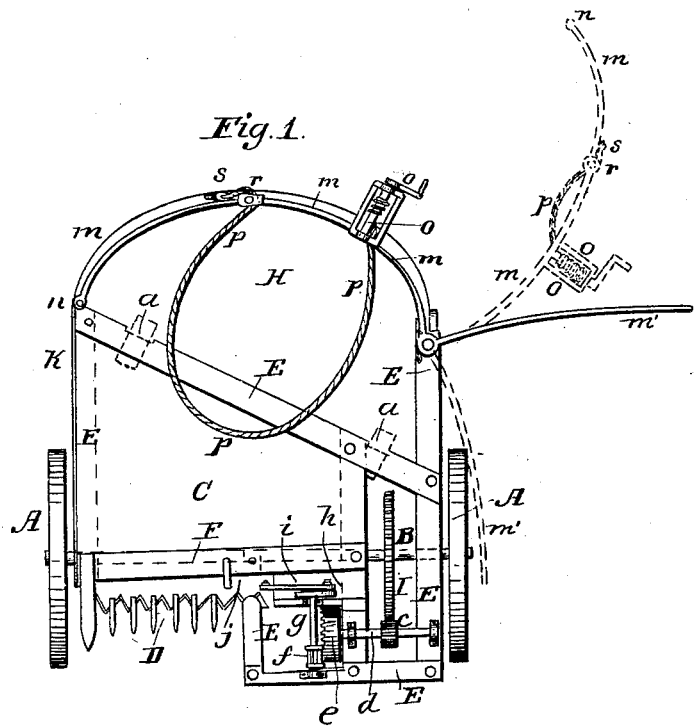
Figure 2:
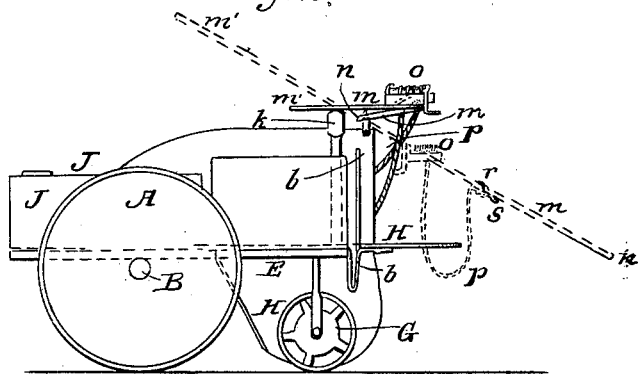

Figure 1 represents a top plan of the machine, and Fig. 2 represents an elevation from one of the sides thereof.

Similar letters of reference where they occur in the separate figures denote like parts in both of the drawings.

My invention consists in combining with a cutting mechanism for severing the corn an arm by which it is caught and held in an upright position and held together and to the arm by a cord, and in this condition swung off the platform and set upon the ground in its upright position, where it may be bound and form a shock.

To enable others skilled in the art to make and use my invention, I will proceed to describe the same with reference to the drawings.

A A represent a pair of driving and carrying wheels upon an axle, B, and upon this axle is placed the platform C, in front of which is the cutting apparatus D, of any approved kind or construction.

The platform-frame is composed of the pieces E, E, E, and F, which latter also serves as the finger-bar; and this frame is further supported at its rear by a caster-wheel, G.

At the rear of the platform C there is hinged, as at a, an apron, H, which is held up by a spring-latch, b, the end of which extends up so as to be readily seized by the driver or operator riding on or walking by the side of the machine.

Upon the axle B there is a cogged gear, I, which works into and turns a pinion, c, fast on a shaft, d, and upon the end of the shaft d there is a drum-pinion, e, that works in a trundle-head, f, on a shaft, g, that carries the crank-wheel h.

To the crank-wheel h one end of the pitman i is attached, the other end thereof being connected to the sickle-bar j, which is vibrated through this system of gearing. The gearing is all covered by a shield, J, which may form a seat for the driver or operator.

On top of a post, k, which is substantially fixed in or on the frame E, there is pivoted a sickle-shaped lever or arm, m, the handle m' of which projects toward the stubble, while the bowed part extends across the rear of the platform or apron H, and its extreme end rests with a dead-eye or loop, n, upon a stud or pin on the outside dividing-board, K. Upon this lever or arm m there is a reel, o, for containing a cord, p, a pulley, r, that the cord passes over, and a hook, s, over which a loop on the end of the cord may be passed to hold it while the slack of the cord is reeled up by the reel o.

The operation is as follows: As the corn is cut it is leaned up in a vertical, or nearly so, position against arm m until sufficient has been gathered to form a shock. The cord p is then passed around it and over the pulley r, and its loop hooked onto the hook s. The reel o is then turned, drawing the cord tight, and holding the stalks tightly against the arm m. When thus reeled up and held the operator seizes hold of the lever m', trips the latch b, and lets the apron fall, and then, by means of the lever m', swings the shock of corn from the platform or apron around onto the ground, out of the way of the return-track of the machine, where it may be bound, the cord slackened, detached from the hook, and the parts swung back into position for another similar operation. When the shock is swung off from the machine onto the ground the lever m and its parts will be in the position shown by red lines in the drawings.

Having thus fully described my invention, what I claim is—

In combination with a machine for cutting corn, a pivoted holding and transferring lever, with its cord, pulley, hook, and reel, for compressing and holding the shock of corn while being transferred from the machine and set up upon the ground, where it may be bound, substantially as herein described and represented.

F. F. FOWLER.

Witnesses:
   A. B. STOUGHTON,
   EDM. F. BROWN.